US010287087B2

(12) United States Patent
Murrell-Cole et al.

(10) Patent No.: US 10,287,087 B2
(45) Date of Patent: May 14, 2019

(54) APPARATUS AND METHOD FOR PRESERVING CARBONATED BEVERAGES OR OTHER LIQUIDS (71) Applicants: Carlyle Murrell-Cole, Cartier (CA); Ryan Fray, Winnipeg (CA)

(72) Inventors: Carlyle Murrell-Cole, Cartier (CA); Ryan Fray, Winnipeg (CA); Mathews Itty, Winnipeg (CA)

(73) Assignee: Carlyle Murrell-Cole, Cartier (CA)

( * ) Notice: Subject to any disclaimer, the term of this patent is extended or adjusted under 35 U.S.C. 154(b) by 189 days.

(21) Appl. No.: 15/318,922

(22) PCT Filed: Jun. 16, 2015

(86) PCT No.: PCT/CA2015/050554
§ 371 (c)(1),
(2) Date: Dec. 14, 2016

(87) PCT Pub. No.: WO2015/192236
PCT Pub. Date: Dec. 23, 2015

(65) Prior Publication Data
US 2017/0129688 A1 May 11, 2017

Related U.S. Application Data (60) Provisional application No. 62/013,650, filed on Jun. 18, 2014.

(51) Int. Cl.
B65D 1/02 (2006.01)
B65D 41/04 (2006.01)
(Continued)

(52) U.S. Cl.
CPC ............ B65D 83/0077 (2013.01); A23L 2/42 (2013.01); B65B 7/16 (2013.01); B65D 1/0246 (2013.01);
(Continued)

(58) Field of Classification Search
CPC ............ B65D 83/0016; B65D 83/0044; B65D 83/0005
(Continued)

(56) References Cited

U.S. PATENT DOCUMENTS 1,630,899 A 5/1927 Lynch
2,019,660 A * 11/1935 De Waltoff ........ B65D 83/0016
222/320

(Continued)

FOREIGN PATENT DOCUMENTS

DE 9319341 2/1994
FR 2638432 5/1990

(Continued)

Primary Examiner — Jeffrey R Allen
(74) Attorney, Agent, or Firm — Kyle R. Satterthwaite; Ryan W. Dupuis; Ade & Company Inc.

(57) ABSTRACT

An apparatus for preserving carbonated beverages or other liquids features a container, and an impermeable piston that divides the container interior into a lower chamber beneath the piston for storage of a liquid, and an upper chamber above the piston. An axially extendable and collapsible conduit has a lower end sealed to the piston around a flow opening that passes axially therethrough, and an upper end connected and sealed to an upper portion of the container around a mouth opening therein. A valve mechanism features a closure member movable between open and closed positions that respectively open and close the flow opening in the piston. Opening of the closure member allows pouring of the liquid out of the container via the flow opening, the conduit and the mouth, and closing of the closure member seals the lower chamber closed in order to preserve the liquid.

19 Claims, 7 Drawing Sheets (51) Int. Cl.
- *B65D 83/00* (2006.01)
- *B65D 81/24* (2006.01)
- *A23L 2/42* (2006.01)
- *B65B 7/16* (2006.01)
- *B65D 47/06* (2006.01)
- *B65D 51/16* (2006.01)

(52) U.S. Cl.
CPC .......... *B65D 1/0284* (2013.01); *B65D 41/04* (2013.01); *B65D 47/065* (2013.01); *B65D 51/1644* (2013.01); *B65D 81/245* (2013.01); *B65D 83/0044* (2013.01); *B65D 83/0072* (2013.01); *A23V 2002/00* (2013.01)

(58) Field of Classification Search
USPC ................................. 222/319, 386; 215/11.1
See application file for complete search history.

(56) References Cited

U.S. PATENT DOCUMENTS

| | | | |
|---|---|---|---|
| 2,341,031 A * | 2/1944 | Flynn | B65D 83/0044 222/320 |
| 3,786,966 A | 1/1974 | Behunin et al. | |
| 4,796,785 A | 1/1989 | Merritt | |
| 4,887,744 A | 12/1989 | Williams | |
| 6,290,105 B1 | 9/2001 | Cosentino | |
| 6,484,897 B1 | 11/2002 | Crawley | |
| 2011/0233119 A1 * | 9/2011 | Nelson | B05B 11/3001 210/117 |
| 2011/0278297 A1 | 11/2011 | Corti | |
| 2011/0290826 A1 | 12/2011 | Harris | |

FOREIGN PATENT DOCUMENTS

| | | |
|---|---|---|
| FR | 2992633 | 1/2014 |
| WO | 8906626 | 7/1989 |

* cited by examiner

APPARATUS AND METHOD FOR PRESERVING CARBONATED BEVERAGES OR OTHER LIQUIDS

This application is the national stage of PCT/CA2015/050554, filed Jun. 16, 2015, and claims benefit under 35 U.S.C. 119(e) of U.S. Provisional Application Ser. No. 61/891,945, filed Oct. 17, 2013 and U.S. Provisional Application Ser. No. 62/013,650, filed Jun. 18, 2014.

FIELD OF THE INVENTION

The present invention relates generally to containers having means for preserving carbonated beverages or other gas containing liquids by preventing or limiting escape of the carbon dioxide or other gas therefrom, and more particularly to a container having a slidable piston that automatically reduces the effective storage volume of the container as the volume of liquid therein is depleted, an extendable and flexible conduit joining a through-flow passage of the piston to a mouth of the container, and a valve mechanism operable to open and close the through-flow passage to switch the container between liquid-dispensing and liquid-preserving modes.

BACKGROUND

The present invention is concerned with preventing or prolonging the expiration of gases contained in various liquids, including carbonated beverages. Conventional containers seek to maintain or limit the escape of gases from carbonated beverages or other gas-pressured liquids by providing a tight seal which prevents leakage from the container. This does not result in limiting the volume of release of gases from the liquid since the volume of unpressurized (or less pressurized) air inside the container increases each time that a further volume of liquid is dispensed from the container. As the volume of the liquid is diminished, the volume of unpressurized air increases. The result is that the gas in the liquid escapes into the unpressurized airspace as it moves from an area of higher pressure to one of lower pressure. This occurs until the gas achieves equal pressure throughout the container. Over time, the gas content in the liquid reduces to a point at which the liquid has lost all its effervescent character, at which point it is considered to have gone "flat".

A number of container designs have been proposed in the prior art for the purpose of prolonging the amount of time it takes for a carbonated beverage to go flat.

U.S. Pat. No. 4,723,670 disclose a hand operated pump device installed on an otherwise conventional soda bottle to enable re-pressurization of the bottle after some of the beverage has been consumed from same in order to help maintain the carbonated state of the beverage.

U.S. Pat. No. 6,484,897 discloses a variable volume container which can be reduced in size as the liquid is depleted therefrom in order to reduce the available airspace into which the carbon dioxide from a carbonated beverage can escape.

U.S. Pat. No. 3,235,138, with reference to FIG. 4 thereof, discloses another approach for maintaining a carbonated state of a beverage by equipping a spigot-drained container with a free riding plate that is biased downward against the upper surface of its carbonated liquid content by a resilient sponge material contained in an impervious flexible bag sealed to the upper end of the container above the free riding plate, whereby the plate is biased downward against the surface of the liquid to maintain pressurization of same.

U.S. Pat. No. 6,290,105 and U.S. Patent Application Publication US2011/0290826 disclose containers for preserving wine from an uncorked bottle. IN each reference, a sliding piston is forced down against the surface of the container's liquid content in order to reduce the effective volume of the container and eliminate any airspace within same to prevent exposure of the wine to atmospheric air. Another piston-equipped container for wine preservation is disclosed in U.S. Patent Application Publication US2011/0114592.

Other piston-equipped containers used for various purposes include those disclosed in U.S. Pat. Nos. 1,630,899, 3,786,966, 4,796,785 3,784,051, DE9319341, DE102006004500, and WO2010124330.

However, there remains room for improved or alternative options in the field concerned, and Applicant discloses herein a new container design that incorporates a unique combination of features neither seen in, nor suggested by, the forgoing prior art.

SUMMARY OF THE INVENTION

According to one aspect of the invention there is provided an apparatus for preserving liquids, said apparatus comprising:

a container having a bottom wall, a peripheral wall standing upward from the bottom wall and enclosing around an interior space of the container disposed above the bottom wall thereof, and an upper portion disposed atop the peripheral wall to substantially close off an upper end of the interior space, the bottom wall and the upper portion being separated from one another in an axial direction of said container;

an impermeable piston disposed within the interior of the container and having a peripheral sliding seal that engages the wall of the container, thereby separating the interior space of the container into a lower chamber disposed below the peripheral sliding seal for storage of a liquid in said lower chamber, and an upper chamber defining a remainder of the interior space above the peripheral sliding seal;

an axially extendable and collapsible conduit having a lower end connected to the piston in a sealed manner around a flow opening that passes axially through the piston at a location spaced inwardly from the peripheral sliding seal, and an upper end connected to the upper portion of the container in a sealed condition around a mouth opening therein; and a valve mechanism comprising a closure member movable between open and closed positions that respectively open and close the flow opening in the piston, whereby opening of the closure member allows pouring of the liquid from the container via the flow opening, the conduit and the mouth, and closing of the closure member seals the lower chamber closed in order to preserve the liquid.

According to another aspect of the invention, there is provided a method of using the forgoing apparatus comprising:

(a) with a liquid disposed within the lower chamber of the interior space of the container, closing the closure member of the valve mechanism, thereby sealing off the liquid during storage thereof within the container.

BRIEF DESCRIPTION OF THE DRAWINGS

Preferred embodiments of the invention will now be described in conjunction with the accompanying drawings in which.

In the drawings like characters of reference indicate corresponding parts in the different figures.

DETAILED DESCRIPTION

Figure 1:
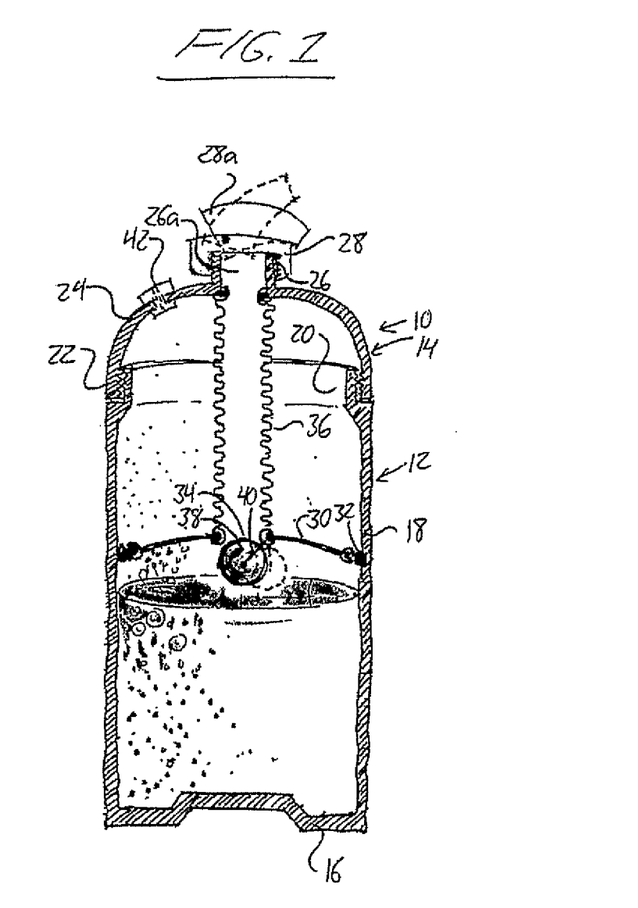
FIG. 1 is a sectioned elevation view of a container according to a first embodiment of the present invention.
Figure 2:
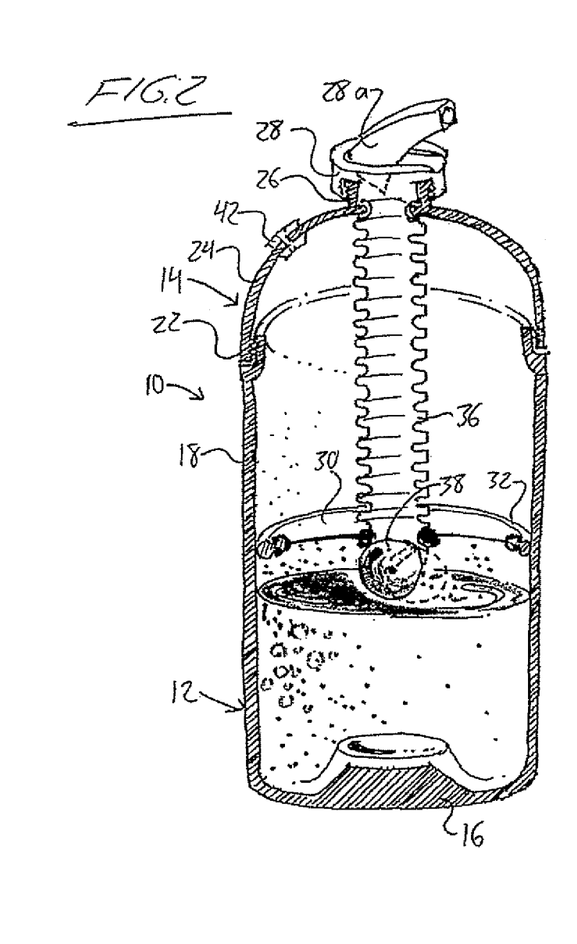
FIG. 2 is a sectioned perspective view of the container of FIG. 1.
Figure 2A:
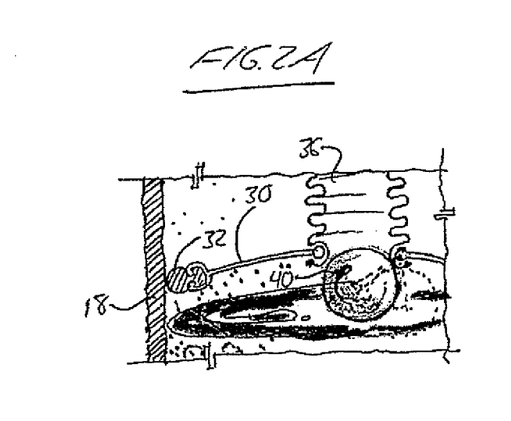
FIG. 2A is a partial detailed view of the container of FIG. 2.

FIGS. 1 and 2 show a first embodiment container of the present invention, which features a bottle 10 made up of a one-piece lower main portion 12 and a separate one-piece upper portion 14 that is selectively attachable to and detachable from the lower portion via cooperable mating threads on the two portions 12, 14.

The lower portion 12 features a bottom wall 16 and a cylindrical peripheral wall 18 standing upright from the bottom wall 16 at the circular periphery of the bottom wall 16. The container is shown in an upright position in which the bottom wall 16 is seated on a horizontal surface and the central longitudinal axis of the cylindrical peripheral wall 18 is oriented vertically. An upper end of the peripheral wall 18 features a reduced outer diameter relative to the remainder of the peripheral wall beneath it, and external threading on this reduced-diameter upper end 20.

The upper portion 14 of the bottle has a cylindrically shaped lower end 22 with internal threading that is matable with the external threading at the reduced-diameter upper end 22 of the peripheral wall 18 of the lower portion 12. Above its internally threaded cylindrical lower end, the upper portion 14 features a dome-shaped intermediary section 24, which at is upper end transitions into an externally threaded neck 26 on which an internally threaded cap 28 is removably engagable in order to close off the internal space of the bottle. With the upper and lower portions 12, 14 of the bottle assembled, they form an overall bottle structure having an enclosed interior space bound by the bottom wall 16, peripheral wall 18 and dome 24. The hollow interior of the neck 26 thus defines a mouth 27 of the bottle by which liquid contents of same can be dispensed by tilting or inverting the bottle from its upright position.

Inside the hollow interior space of the bottle 10, a piston 30 is slidably sealed to the interior surface of the peripheral wall 18 by a silicone washer 32 or other seal engaged around the outer periphery of the piston 30, whereby the piston 30 is slidable along the longitudinal axis of the bottle while maintaining a fluid-tight seal with the peripheral wall 18 thereof. The piston 30 divides the interior space of the bottle into a lower chamber beneath the piston and an upper chamber above the piston 30. The piston 30 may be made of stainless steel, or other materials that will not be degraded by regular or extended exposure to liquid stored within the container. The use of stainless steel provides such degradation resistance while having greater weight than a piston made of plastic or other lightweight material, whereby the weight is sufficient to overcome the frictional resistance between the peripheral wall and the sliding seal so that the piston 30 is gravitationally biased downwardly toward the bottom wall 16 of the bottle. The position of the piston within the bottle at any given time will accordingly depend on the level of liquid within the bottom chamber of the bottle's interior, whereby the piston 30 forms a travelling lid that closes over the surface of the liquid in either contact therewith or close proximity thereto.

A flow-through opening 34 passes axially through piston/lid 30 at a central location thereon. A flexible conduit 36 has a lower end thereof attached in a fluid-tight manner to the piston/lid 30 at an area around the flow-through opening 34. An upper end of the conduit 36 is attached to the upper portion 14 of the bottle in a fluid-tight manner, for example by a silicone or other suitable membrane, at an area surrounding the hollow interior of the neck 26 at the transitional area between the neck 26 and the dome 24. The conduit 36 thus forms a fluid-tight passage running axially of the bottle from the central through-flow opening 34 of the piston to the centrally located neck 26 of the bottle. The conduit thus fluidly connects the lower chamber of the bottle to the mouth 27 thereof.

As shown, the conduit may be defined by a corrugated straw of silicone or other flexible material, whereby accordion-like pleats or folds enable axial collapse and expansion of the straw along the longitudinal axis of the bottle. This way, the overall length of the straw can increase and decrease to allow the axial sliding of the piston/lid 30 within the bottle's interior. Flexible straws of this type are commercially available, having been known for use as drinking/sipping straws through which beverages are often consumed. The weight of the piston/lid 30 is selected to exceed to flexible straw's resistance to axial expansion, thereby ensuring the automatic downward bias of the piston/lid 30 toward the bottom wall 16 of the bottle.

A valve mechanism is provided at the underside of the piston/lid 30 at the flow-through opening 34 therein, and is operable to open and close this opening 34 in order to allow and prevent fluid flow from the lower chamber of the bottle up to the mouth thereof through the axially extendable and collapsible conduit 36. The valve features a closure member 38 in the form of a buoyant ball of lower density than the liquid to be stored, whereby the ball will float inside the lower chamber of the container when filled with such liquid. For example, the closure ball 38 being made of a buoyant silicone rubber compound. Due to the gravitational downward bias of the piston/lid 30 and the buoyancy of the closure ball 38, the floating of the ball 38 at the surface of the liquid in the lower chamber will bias the ball upwardly against the piston. The closure ball 38 is hung from the piston by a short tether 40 that attaches to the piston at a point thereon that resides adjacent to the flow-through opening 34. The tether serves to limit the available range of the movement of the closure ball 38. The length of the tether is such that the tether is in a taught condition when the ball is in a closed position seated against the piston/lid at the flow-through opening 34. In this closed position, the ball 38 seals off the flow-through opening 34 and therefore blocks fluid flow between the lower chamber of the bottle and the conduit 36 that passes axially through the upper chamber.

The underside of the piston/lid 30 is slightly contoured over at least part of its area so that the flow-through opening 34 is slightly elevated from a surrounding area of the piston/lid's underside, and a suitable stop is provided to block movement of the closure ball 38 past an under-center position relative to its tether connection point on the piston in the cross-sectional plane of the bottle that contains the longitudinal bottle axis and the tether connection point. This way, with the bottle in its upright position, the floating action of the buoyant closure ball 38 will always lead to closure of the piston's flow-through opening 34 by the closure ball 38. In the illustrated embodiment, the stop is formed by a lip at the lower end of the conduit 36 that hooks around the bottom of the flow-through opening 34 in the piston. However, other means of forming a suitable stop may be employed, for example by providing the piston with a shape that defines a built-in stop protruding downwardly at a position beside the flow-through opening 34.

A one-way air valve 42 is removably mounted in the domed section 24 of the upper portion 14 of the bottle. As a result, the vacuum or reduced pressure that is created in the upper chamber of the bottle interior due to the lowering of the piston/lid 30 as the liquid level is depleted will draw atmospheric air into the upper chamber through this one-way valve 42. The prevention of airflow in the reverse interior-to-exterior direction acts to maintain pressure in the upper chamber 42.

To use the container, a volume of carbonated beverage or other gas-containing liquid is introduced into the lower chamber of the container. To accomplish this, with the upper and lower portions of the bottle in an assembled state free of any liquid content, the one-way valve 42 and the cap 28 are removed. This exposes each of the upper chamber, the flexible conduit, and the lower chamber to the outside environment so as to equalize these spaces with one another at atmospheric pressure. The liquid is then poured into the lower chamber of the container through the bottle neck 26 and flexible conduit 36, whereby the weight of the poured fluid will displace the closure ball 38 from its closed position blocking the flow-through opening 34 to allow the liquid to fill the lower chamber. The rising liquid level in the lower chamber will force the piston/lid 30 upwardly, thus also axially collapsing the flexible conduit 36 in an upward direction. When the desired amount of liquid has been introduced into the lower chamber, the one-way valve 42 is replaced at its operable position seated within a suitable opening in the upper portion 14 of the bottle 10. The floating action on the buoyant closure ball 38 forces it into the closed position blocking off the flow-through opening 34 and the conduit, and the piston/lid 30 resides in contact against, or in close proximity to, the surface of the liquid. The piston/lid 30 thus minimizes the available airspace into which the carbon dioxide or other gas from the carbonated beverage or other gas-containing liquid can escape. The pressure within this limited space between the liquid and the piston/lid 30 results in a quick equalization of pressure between this airspace and the liquid, thus limiting the amount of carbon dioxide or other gas that is released from the liquid. Accordingly, the carbonated or gas-containing state of the beverage or other liquid is maintained.

When a user wishes to dispense some or all of the beverage from the container, the mouth of the bottle 26 is opened up, for example by unscrewing the air-tight cap 28, or by using a selectively openable and closeable feature provided on same. For example, the illustrated embodiment features a foldable mouth piece 28*a* that is hinged to the cap 28 for movement between an open position that fluidly communicates the mouth 27 of the bottle neck with the external environment outside the bottle via a flow-through passage of the mouth piece 28*a*, and a closed position that closes off the flow-through passage of the mouth piece from the external environment in order to close off the mouth of the bottle neck. The bottle is tilted out of the upright position, or even fully inverted therefrom into an upside down orientation, whereby the floating action of the buoyant closure ball 38 will no longer displace it into a position perfectly sealing off the flow-through opening 34 of the piston, so long as the tilted orientation of the container is not one that places the central longitudinal axis of the bottle and the tether connection point on the piston in the same vertical plane. The one-way air valve 42 is opened to reduce pressure in the upper chamber and allows the piston/lid 30 to slide upwards and the beverage to flow upward through the opening 34. In the event that the particular orientation of the tilted bottle does reseat the closure ball 38, a minor change in the bottle orientation is sufficient to shift the closure ball position and open up the flow-through passage in the piston. Accordingly, the liquid from the bottom chamber can flow through the flow-through opening 34 of the piston, and onward into and through the mouth 27 of the bottle via the conduit 36, thereby dispensing this liquid from the bottle, either through the uncapped bottle neck 26 or a opened mouthpiece 28*a* situated thereon.

Figure 3:
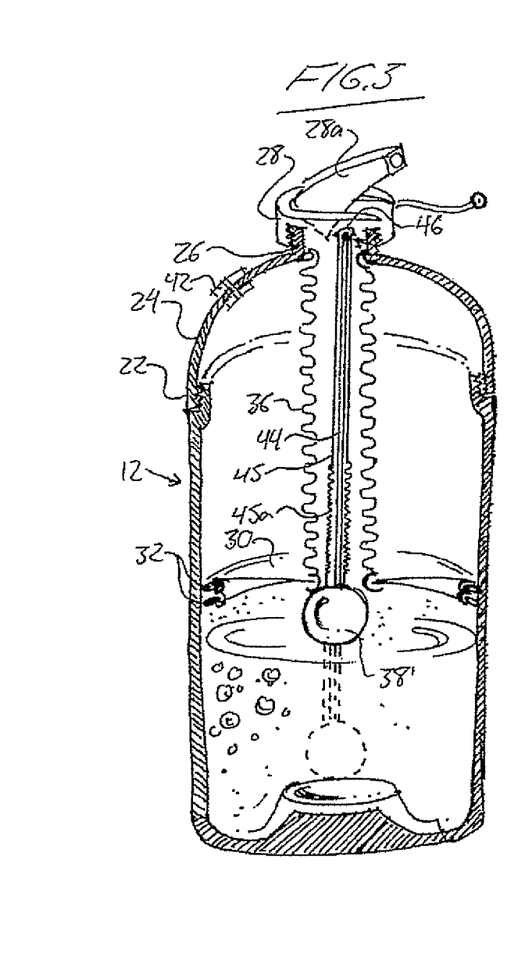
FIG. 3 is a schematic sectional view of a container according to a second embodiment of the present invention.
Figure 4:
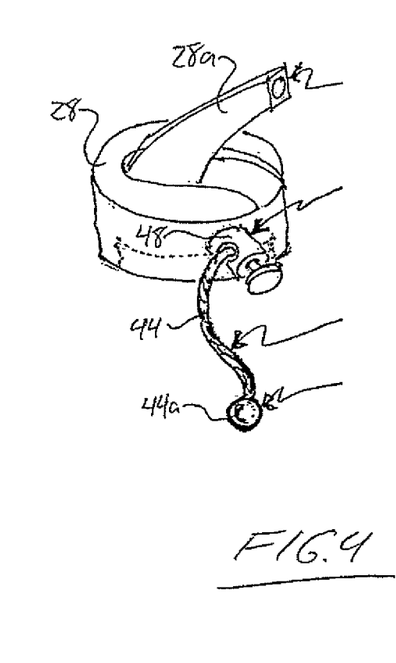
FIG. 4 is a perspective view of a cap of the container of FIG. 3, showing cooperating devices for controlling an internal valve mechanism of the container from the exterior thereof.

FIGS. 3 and 4 illustrate a second embodiment container with a similar configuration of a bottle 10' having upper and lower portions 14', 12, a piston/lid 30 slidably disposed within the bottle's interior space, a flexible conduit 36 connected between the piston/lid 30 and the upper portion 14' of the bottle 10', a cap 28 with a flip-up/fold-down mouthpiece 28*a*, and a ball-shaped closure member 38' operable to open and close a flow-through opening 34 in the piston/lid 30. As illustrated, the piston/lid 30 may have two silicone washers or other sliding seals 32 to improve the fluid-tightness of the piston's sealed contact with the peripheral wall 18 of the bottle 10'.

Referring to FIG. 3, the valve mechanism operable to open and close the flow-through passage of the piston/lid 30 differs from that of the first embodiment in a few ways. Firstly, the closure ball 38' is not buoyant, and instead has a density exceeding that of the liquid stored in the lower chamber of the bottle's interior space so that the ball will sink within the fluid down to the bottom wall 16 of the bottom chamber unless otherwise supported. A flexible elongated pull member 44 in the form of a string, cord, cable or the like has a lower end thereof attached to the closure ball 38'. The pull member 44 extends upwardly through the conduit 36 and then out of the bottle's interior space into the external environment through an outlet port 46 in the removable threaded cap 28 of the bottle 10. To prevent exposure of the pull member to liquid being poured from the container, or introduced thereto, through the flexible conduit 36, a sleeve 45 closes around the pull member 44 and has one end attached to the closure ball 38' and the other end attached to the interior of the cap 28 at an area surrounding the port 46 through which the pull member 44 extends. At least a lower portion 45a, or the entirety, of the sleeve 45 has an axially extendable and collapsible configuration like that of the flexible conduit 36 so that the sleeve can expand and contract with movement of the closure ball 38' on the pull member 44.

Turning to FIG. 4, a spring-loaded cord-lock 48 is provided on the flexible pull member 44 at a point on the pull member 44 residing externally of the bottle between the outlet port 46 of the bottle and the free end of the pull member 44a that hangs from the cap 28 at the exterior of the bottle. Alternatively, it may be possible to incorporate the cord lock mechanism into the structure of the cap 28 itself. The pull member 44a may feature a knot or other enlargement or attachment at this free end 44a in order to prevent sliding of the cord-stop 48 from off this end 44a of the pull member 44.

The cord-stop is of a conventional type in which an outer barrel and a sliding inner plunger telescopically received therein having matching diametrical through-bores of sufficient size to receive passage of the cord/cable/string 44 through them when aligned. A compression spring disposed between the inner end of the plunger and the closed end of the barrel acts to bias the plunger toward a position in which its through-bore is situated outwardly beyond that of the barrel. This results in pinching of the cord/cable/string 44 between plunger and barrel where the cord/cable/string 44 passes through the misaligned through-bores, thus locking the cord-lock to the cord/cable/string 44. Squeezing the plunger further into the barrel against the bias of the compression spring releases this locking action, whereupon the cord-lock can be slid to any desired point along the cord/cable/string 44. Release of the squeezing action re-locks the cord lock 48 onto the cord/cable/string 44 at this selected location.

The cord lock 48 forms a movable stop that can be relocated to various positions along the length of the pull member 44. The weight of the closure ball 38' inside the bottle 10' draws the pull member 38' downwardly through the conduit 36 further into the lower chamber of the bottle until the ball 38' reaches the bottom wall 16 of the container. The cord-lock 48, being too large to pass through the pull member's outlet port 46 in the cap 28, serves as a stop which limits this drawing-down of the pull member 44 into the container's interior space. A user can thus lock the ball 38' in the closed position sealing off the flow-through passage 34 in the piston/lid 30. To accomplish this, the user pulls on the free end of the pull member 44 outside the bottle, which pulls the ball 38' upward into the closed position against the underside of the piston at the boundary of the flow-through opening 34 therein. The user squeezes the cord-lock into its released condition, and slides the cord lock 48 into a position abutting against the exterior of the cap 28 of the bottle 10' at the outlet port 46 therein. Here, the cord-lock is released back into its self-locking condition frictionally engaging the pull member 44, whereby pull member is blocked from being drawn further into the container by the weight of the ball 38'. Being attached to the pull member 44, the ball 38' thus cannot fall from the closed position so long as the cord-lock 48 remains secured in place.

The pull member 44 thus provides a control device by which a user can control movement of the closure ball 38' into the closed position from outside the container, and the cord-stop provides a locking device to lock the closure ball 38' in the closed position, and subsequently release the ball from same by releasing the self-locking action of the cord lock 48.

Operation of the second embodiment is outlined as follows. Initially, the carbonated beverage or other gas-containing liquid is introduced into the lower chamber of the bottle, for example in a similar manner as that described above for the first embodiment. After filling the container and threading the cap 28 back onto the bottle neck 26, the pulling member 44 is then pulled into a tensioned state acting to force the closure ball up against the piston in order to close off the flow-through port thereof. The cord lock 48 is locked to the pull member 44 at the point where it passes through the port in the cap, thereby securing the closure ball 38' in this closed condition. The top side of the sliding piston/lid 30 holds air under pressure within the top chamber of the bottle interior. The underside of the sliding piston/lid 30 contains the carbonated or other pressurized liquids with pressurized gas or gases inside the lower chamber. Pressure underneath the sliding piston/lid 30 is thus maintained by tension applied to the ball-seal 38' via the string 44, which is pulled upward and held secure by the spring-clip or cord-lock 48 at the cap.

To dispense liquid from the container, the mouthpiece 28a is opened and the spring-clip or cord-lock 48 is squeezed, allowing the weighted ball-seal 38' to fall. The container is tilted to allow the outflow of liquid through the mouthpiece 28a via the flexible conduit 36 and bottle neck 26. As the liquid level beneath the sliding piston/lid 30 falls, a negative pressure is created in the upper chamber above the sliding piston/lid. The one-way air valve 42 allows the inflow of atmospheric air into the upper chamber since the external atmospheric pressure is greater than the relative negative pressure inside the upper chamber, as created by the downward sliding of the sliding piston/lid 30.

To re-close the container, the string/cord/cable 44 attached to the ball-seal 38' is pulled tight after the spring-clip or cord-lock 48 is squeezed. The spring-clip or cord-lock 48 is then released and the ball-seal 38' is thus held firmly in the closed position by the tension created in the string/cord/cable. The pressure in the upper chamber is now equal to the upper force created in the tension in the string. The system's pressure is now static as the pressure in the lower chamber is maintained by the seals of the ball-seal 38', the seal(s) 32 on the perimeter of the sliding piston/lid 30 and the pressure in the upper chamber (as maintained by the one-way valve 42).

To empty and clean the container, the spring-clip or cord-lock 48 is pressed so as to completely release the ball-seal 38', and the cap 28 and one-way air valve are disengaged from the bottle. In this state, the pressure is equal (at atmospheric pressure) between the upper and lower chambers of the bottle above and below the sliding piston/lid 30. Any inflow or outflow of liquid through the bottle neck and attached flexible conduit will cause the sliding piston/lid 30 to move up or down in response to either gravity or the pressure of any liquid in the lower chamber. Remaining liquid can be poured out through the flexible conduit 36 prior to disassembly of the upper and lower portions of the bottle, or poured out through the open top end of the cylindrical lower portion of the bottle after removal of the upper portion and attached conduit and piston/lid therefrom for cleaning purposes.

FIG. 5 illustrates a third embodiment once again featuring a bottle 10" having upper and lower portions 14", 12', a piston/lid 30' slidably disposed within the bottle's interior space, a flexible conduit 36 connected between the piston/lid 30' and the upper portion 14' of the bottle 10", a cap 28' which may again feature a flip-up mouthpiece (not shown), and a sinking closure member 38' operable to open and close a flow-through opening 34 in the piston/lid 30'. The piston/lid 30' is once again in sealed fluid-tight, slideable contact with the peripheral wall 18 of the bottle 10'. In the drawings of this embodiment, the closure member 38" is not a spherical ball, but is once again cooperatively shaped relative to the bottom end of the flow-through opening 34 in the piston in order to seal the same closed when the flexible elongated pull member 44 is drawn upward to raise the closure member into the closed position sealed against the underside of the piston at the flow-through opening.

The third embodiment differs from the second embodiment in a few notable ways, including the addition of a lower one-way valve 50 in the bottom wall 16 of the container to enable air to enter, but not exit, the lower chamber of the container beneath the piston 30', the use of a winding mechanism 52 for operating the elongate member 44 to control the position of the closure member 38", the addition of a piston locking device 54 for selectively locking the piston 30' in a fully raised position adjacent the upper portion 14' of the container, the addition of a compression spring 56 coiled around the axially collapsible and expandable flexible conduit 36 in order to help bias the piston 30' downward against the liquid contained in the lower chamber, and division of the lower portion 12' of the container into two detachable sections, specifically an upper section 12a which defines a substantial majority of the peripheral wall 18 of the container and a lower section 12b which defines the bottom wall 16 of the container and a threaded annular wall that matingly threads with the first piece to complete the peripheral wall 18 of the overall container.

Figure 5A:
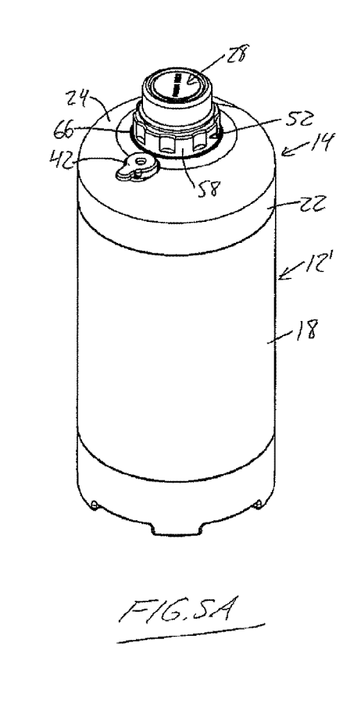
FIGS. 5A, 5B, 5C, and 5D are perspective, top, cross-sectioned elevation and cross-sectioned perspective views, respectively, of a container according to a third embodiment of the present invention, with a piston of the container in an unlocked movable state in each figure, and with a spring of the container omitted in FIG. 5D for illustrative simplicity.
Figure 5B:
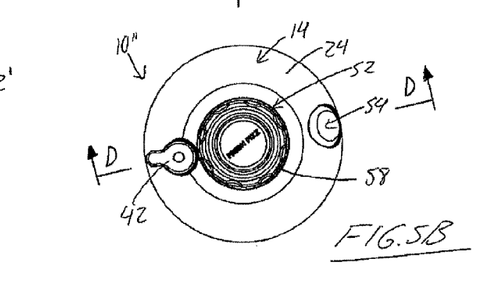
Figure 5C:
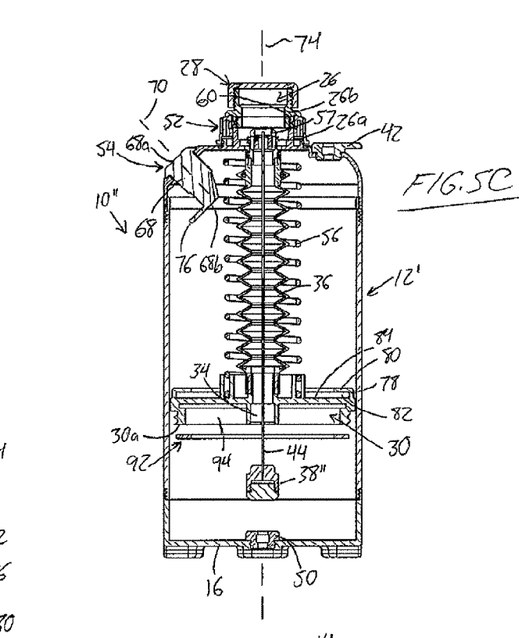

Firstly, attention is turned to the winding mechanism 52 for controlling the flexible elongated member 44 on which the closure member 38" is suspended in the lower chamber of the container. The winding mechanism 52 features an annular collar 58 circumferentially disposed around the neck 26 of the bottle at the top of the intermediary section 24 of the upper portion 14' of the container. The flexible elongate member 44 extends upward from the closure member 38" through the flow-through opening 34 of the piston and the flexible conduit 36 into the neck 26 of the bottle, where it then exits the neck through a radial hole or port 57 therein, in similar manner to the second embodiment of FIG. 3. However, the position of this hole in the neck in the third embodiment is axially short of the threaded cap's position further up the neck. Therefore, instead of continuing outward through the cap to a manually exposed position outside the rest of the apparatus, the flexible elongate member 44 in the third embodiment feeds into an annular space 59 defined between the neck 26 of the bottle and the surrounding collar 58 that is rotatably disposed around the neck. Here, one end of the flexible elongate member 44 is attached to the rotatable collar 58.

Figure 5D:
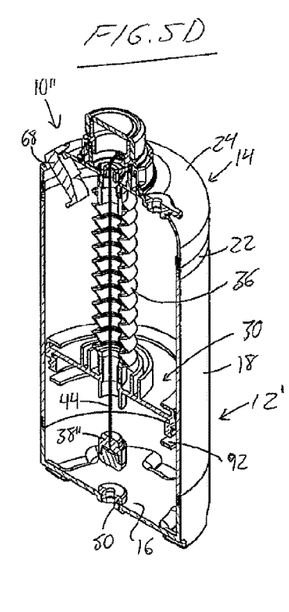
Figure 6A:
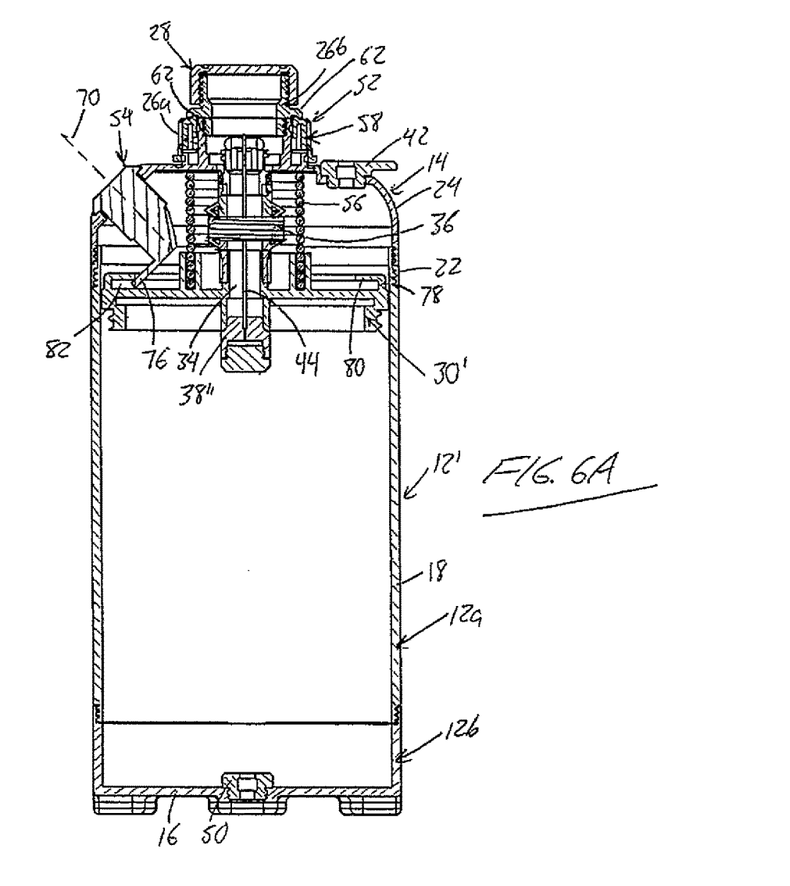
FIG. 6A is a cross-sectional elevation view of the container of FIG. 5 with the piston locked in a fully raised position.

As a result, rotation of the collar 58 around the neck 26 in one direction acts to wind more of the flexible elongate member 44 around the neck 26, thus shorting the remainder of the flexible elongate member 44 that remains inside the container, and thereby pulling the closure member 38" upwardly inside the lower chamber into the closed position abutting against the underside of the piston. Continued rotation of the collar 58 in this direction pulls the piston 30' upwardly inside the bottle toward the upper portion 14 thereof. FIGS. 5C and 5D show the piston 30' in a lowered position residing nearer to the bottom wall of the bottle than the to the upper portion thereof, which corresponds to an at least partially expanded state of the flexible conduit 36 and the spring 56 disposed around same. Rotating of the collar 58 in the winding direction pulling the closure member 38" upwardly eventually displaces the piston 30' into a fully raised position residing adjacent to the upper portion 14 of the bottle, as shown in FIG. 6A. In this fully raised position of the piston 30', the piston locking device 54 can be used to hold the piston in place, as described herein further below. When lowering of the piston 30' from the fully raised position is desired, rotation of the collar 58 in the opposite direction unwinds more of the flexible elongate member 44 from the annular space between the neck and collar, releasing more of the flexible elongate member back into the bottle. This allows the closure member 38' to fall toward the bottom wall 16 of the bottle, and the piston 30' to likewise follow downwardly behind the closure member 38".

The collar 58 is self-locking so as to maintain its given angular position around the neck 26, and is unlocked to allow rotation of the collar in either direction by manual pushing of the collar 58 downwardly toward the bottom wall 16 of the bottle in an axial direction of the neck 26, which in the illustrated configuration is identical to the axial direction of the overall container due to the concentric relation of the neck to the cylindrical peripheral wall 18 of the container.

The neck 26 of the third embodiment is made up of multiple sections, namely a lower section 26a around which the rotatable collar 58 is disposed, and a separate upper section 26b engaged to the lower section 26a in order to stand concentrically upward therefrom and define an externally threaded top end of the overall neck 26 at which the internally threaded cap 28 is removably engagable. The lower neck section 26a is internally threaded at its upper end to define a threaded interface 60 at which an externally threaded bottom end of the upper neck section 26b is engagable. At an intermediate location between the externally threaded top and bottom ends of the upper neck section 26b, an external flange 62 projects radially outward from the upper neck section 26b. In an underside of this flange 62, a plurality of female sockets 64a are axially recessed into the flange 62 at closely and evenly spaced intervals around the full circumference of the bottle neck 26.

The collar 58 features an outer peripheral wall 58a that spans circumferentially around the lower neck section 26a of the bottle at a radial distance outward therefrom to delimit the annular space that accommodates the wound portion of the flexible elongate member 44. As best shown in FIG. 5A, the exterior surface of this peripheral wall 54a may be scalloped at regular intervals therearound to provide suitable gripping features for grasping with one's fingertips during rotation of the collar 58. A top end wall of the collar 58b spans radially inwardly from the peripheral wall 54a thereof to cover the annular space 59 in which the flexible elongate member is wound. Attachment of the flexible elongated member 44 to the collar inside the annular space 59 may be accomplished in any manner suitable of making a secure connection, one of which is shown in FIG. 6D. In the illustrated example, a cylindrical boss 61 extends downward from the underside of the top end wall 58b of the collar in the axial direction, and terminates short of the lower end of the peripheral wall 58a. A downwardly opening axial bore 61a extends upwardly into the boss 61 from the lower end thereof to accept a threaded screw fastener 61b therein. During assembly of the container, the end of the flexible elongated member 44 disposed within the annular space 59 between the peripheral wall 58a and the bottle neck 26 is wrapped around the shaft of the screw fastener 61a, which is then fastened into the boss 61 in order to clamp the end of the flexible elongated member 44 in place between the end of the boss 61 and the head of the screw fastener 61b.

Figure 6B:
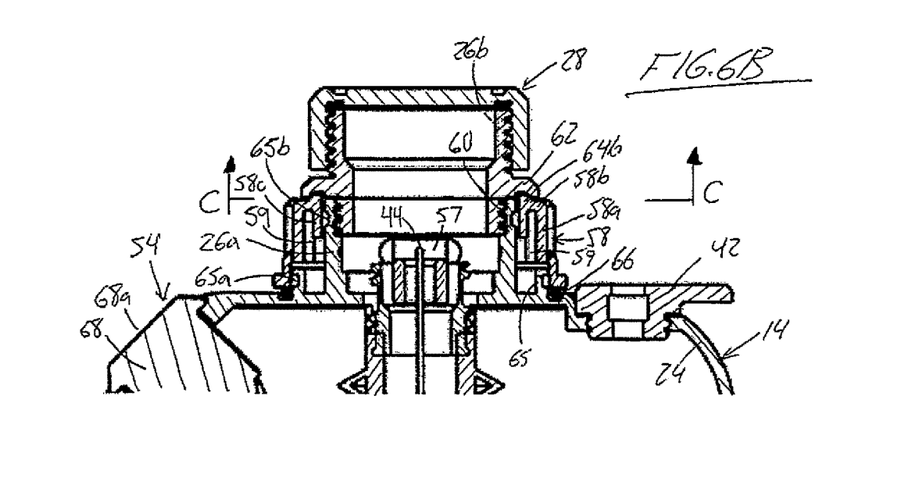
FIG. 6B is partial closeup view of the container of FIG. 6A.

Referring to the enlarged view of FIG. 6B, to prevent liquid from escaping the bottle during pouring via the hole or port 57 in the lower neck section 26*a* by which the flexible elongate member 44 enters the annular space 59 inside the collar 58, the upper portion 14 of the bottle features an upstanding annular rim 65 located outward from the lower neck section with has an outwardly facing groove 65*a* therein for receiving a seal (not shown) that seals between this rim 65 and the inner surface of the collar's peripheral wall 58*a* near the bottom end thereof. The lower neck section 26*a* features another such outwardly facing groove 65*b* therein near the top end thereof for receiving a second such seal (not shown) that seals between the lower neck section 26*a* and a short inner wall 58*c* of the collar that extends downwardly from an inner end of the top wall 58*b*. This inner wall 58*c* is notably shorter than the outer peripheral wall 58*a* so as to stop short of the hole or port 57 located further down the lower section 26*a* of the neck 26, thereby leaving the annular space 59 open to this hole or port 57 to accommodate passage of the flexible elongate member to and from the annular space 59.

Figure 6C:
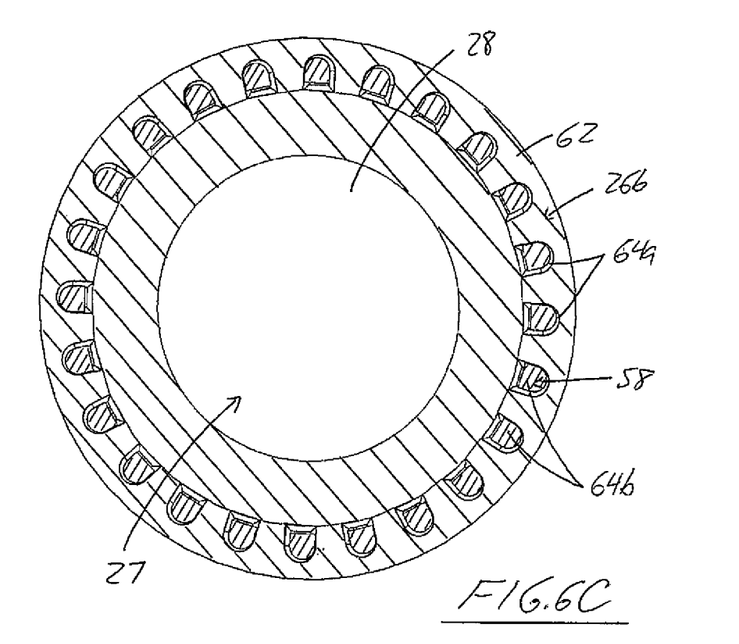
FIG. 6C is a schematic cross-sectional view of the container as taken along line C-C of FIG. 6B.
Figure 6D:
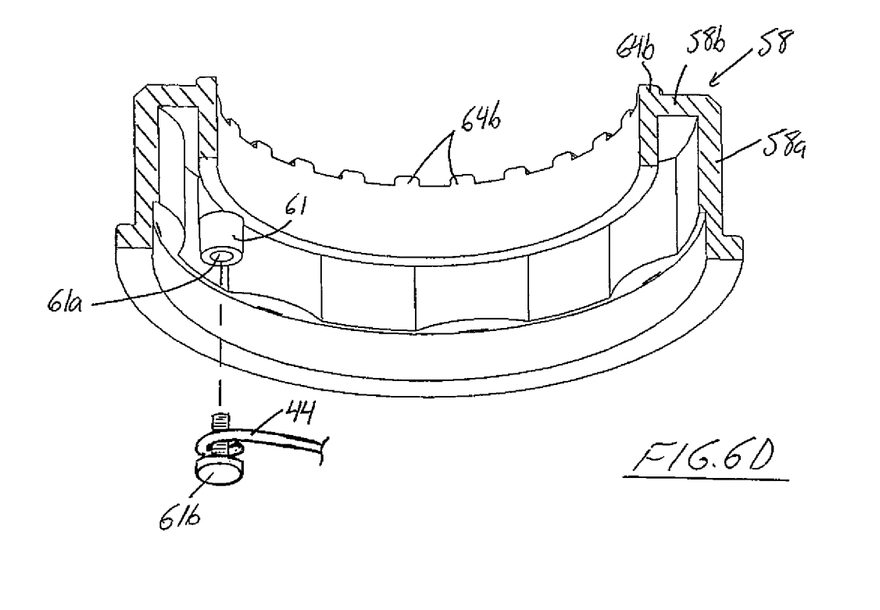
FIG. 6D is cross-sectioned perspective view of a rotatable collar of a winding mechanism the container as cut along line D-D of FIG. 5B, which also denotes the cutting plane of FIGS. 5C and 5D.

A plurality of male stubs 64*b* project axially upward from the top end wall 58*b* of the collar 58 at spaced apart locations therearound. Each stub 64*b* is sized so as to be matingly received in any one of the female sockets 64*a* in the underside of the flange 62, and the angular spacing between the male stubs around the neck 26 is equal to an integer multiple of the angular spacing around the neck between any two adjacent female sockets 64*a*. As a result, any angular position of the collar 58 around the neck that aligns one male stub 64*b* with one of the closely spaced female sockets 64*a* will automatically align each of the other male stubs with a respective one of the female sockets. FIG. 6C schematically shows a configuration in which the number of male stubs 64*b* is equal to the number of male sockets, but it will be understood that the male stubs could be fewer in number than the female sockets. At little as one male stud may be sufficient to lock the collar in place, although a plurality (i.e. two or more male studs) evenly spaced apart around the circumference of the collar is preferable to impart greater stability to the locked position of the collar and prevent flexing, deformation or damage if rotation of the collar is attempted in the locked state.

The bottom end of the collar's peripheral wall 58*a* is seated atop an o-ring 66 that is disposed around the lower section 26*a* of the bottle neck 26 at the bottom end thereof that joins to the intermediary section 24 of the bottle's upper portion 14. A natural uncompressed state of the compressible o-ring 66 biases the collar 58 upwardly in a lock-engaging axial direction of the neck 26 that forces the male stubs 64*b* into the female sockets of the flange 62 residing overhead of the collar. When rotation of the collar 58 is required, the user pushes the collar 58 downwardly against the o-ring 66, causing the o-ring 66 to compress between the bottom end of the collar 58 and the underlying intermediary section 24 of the bottle's upper portion 14. The axial compressibility of the o-ring is sufficient to allow displacement of the collar 58 far enough in a downward lock-releasing axial direction of the neck to withdraw the male stubs 64*b* from the female sockets 64*a*. When the male and female features 64*b*, 64*a* carried on the collar 58 and the bottle neck's flange 62 are engaged together, they prevent rotation of the collar 58 around the neck 26. This locks the collar in its current angular position around the neck, thereby locking the flexible elongate member 44 at its current wound/unwound state (i.e. fixes the amount of the flexible elongate member residing outside the bottle at the annular space between the collar and neck versus the amount of the flexible elongate member residing inside the bottle to suspend the closure member 38" therein). The closure member 38" is thereby lockable at various hanging positions inside the bottle.

Turning attention now to the piston locking device 54, it comprises a locking member 68 that extends into the upper chamber of the bottle through the intermediary section 24 of the upper portion 14 of the bottle along a sloped axis 70 that angles obliquely downward moving toward the central longitudinal axis 74 of the container. The locking member 68 extends along the sloped axis 70 from an actuator end 68*a* of the locking member that is disposed externally of the container to a working end 68*b* of the locking member that is disposed inside the upper chamber of the container and terminates at a distance short of the spring 56 that shares the same longitudinal axis 74 as the flexible conduit 36 and the overall container. The working end 68*b* of the locking member 68 features an eccentric 76 that juts outwardly away from a remainder of the locking member 68 in a singular radial direction relative to the sloped axis 70 in a plane normal thereto. For cooperation with the locking member 68, the topside of the piston 30' features a short annular wall 78 standing upward near the outer periphery of the piston, and an inwardly extending annular flange 80 jutting radially inwardly from the top end of the short annular wall 78 toward the central longitudinal axis 74 of the container. A slot-like space 82 is bound between the inwardly extending flange 80 and an upper face 84 of the piston from which the short annular wall 78 is upstanding.

Using the actuator end 68*a* disposed externally of the container, the locking member 68 is rotatable about the sloped axis 70 passing centrally therethrough. The drawings show the locking member 68 in a locking position in which the eccentric 76 at the working end 68*b* thereof angles downwardly away from the remainder of the locking member 68 in a direction sloping away from the container's central longitudinal axis 74 toward the peripheral wall 18 of the container. The locking member 68*b* is rotatable out of this downwardly reaching lock position into a release position residing 90-degrees therefrom around the sloped axis 70 so as to place the eccentric 76 in a horizontally extending, rather than downwardly angled, position.

With reference to FIG. 6A, to prepare the container for filling, the upper one-way valve 42 is removed to enable air to exit the upper chamber, and raising of the closure member 38" via the winding mechanism 52 is used to draw the piston 30' upwardly into its fully raised position residing adjacent the upper portion 14 of the container. At this point, the upper one-way valve 42 may be replaced, and the locking member 68 is rotated into the illustrated locking position, which causes the distal outer tip of the eccentric 76 to swing into the slot-shaped space 82 between the inwardly extending flange 80 of the piston 30' and the upper face 84 thereof. The flange 80 thus hooks over the tip of the eccentric 76 to catch the piston 30' on the locking member 68, thereby locking the piston 30' in its fully raised position.

Locked in its fully raised position, the piston 30' no longer relies on the fully raised position of the closure member 38' to hold the piston in place, and so the collar 58 of the winding mechanism 52 can be unlocked (i.e. pushed downward) and rotated in the unwinding direction to lower the closure member 38" downwardly out of its closed position abutting against the underside of the piston and into a fully lowered position corresponding to a fully unwound state of the flexible elongated member 44. This lowering of the closure member 38" opens up the flow-through opening 34 in the piston 30'. With the closure member opened in this manner and the piston locked in its fully raised position, the self-locking collar 58 is released into its default locked position and the cap 28 is removed, and liquid is poured into the neck 26 of the container so as to fill the lower chamber with the desired amount of liquid through the collapsed flexible conduit 36 and the unobstructed flow-through opening 34 of the piston.

Once the lower chamber is filled with the desired volume of liquid, the locking member 68 is rotated out its locking position into its release position, thereby disengaging the distal tip of the eccentric 76 from the space 82 under the inwardly extending flange 80 of the piston to release the piston 30' from its locked state, whereupon the piston will be biased downwardly against the upper surface of the liquid in the lower chamber by the combination of gravity and the compression spring 56. At this point, the user unlocks the collar 58 of the winding mechanism 52 and turns the same in the winding direction to pull on the flexible elongate member 44 and the closure member 38' carried thereon so as to pull the closure member 38" into its closed position blocking off the flow-through opening 34 in the piston 30' so as to seal off the lower chamber and preserve the liquid therein, whereupon release of the collar 58 will automatically lock the closure member 38" in this closed position.

When consumption of the liquid is desired, the flow-through opening is re-opened by unlocking the collar 58 and rotating the same in the unwinding direction to lower the closure member 38" out its sealed position against the piston 30'. The downward biasing of the piston by gravity and the spring will urge the piston against the now-lower surface of the more-depleted volume of liquid remaining the container. The closure member can be drawn back up into the closed position again using the rotatable collar 58 of the winding mechanism 54 to continue preserving the remaining liquid until the user next wishes to consume more of same. Unwinding to the fully unwound state during each unwinding of the flexible elongate member 44 to release the closure member 38" from the piston 30' and open the flow-through opening 34 may be preferable to ensure that the closure member 38" doesn't block the automatically lowered piston 30' from reaching the surface of the reduced level of volume remaining in the container after consumption therefrom.

Figure 7:
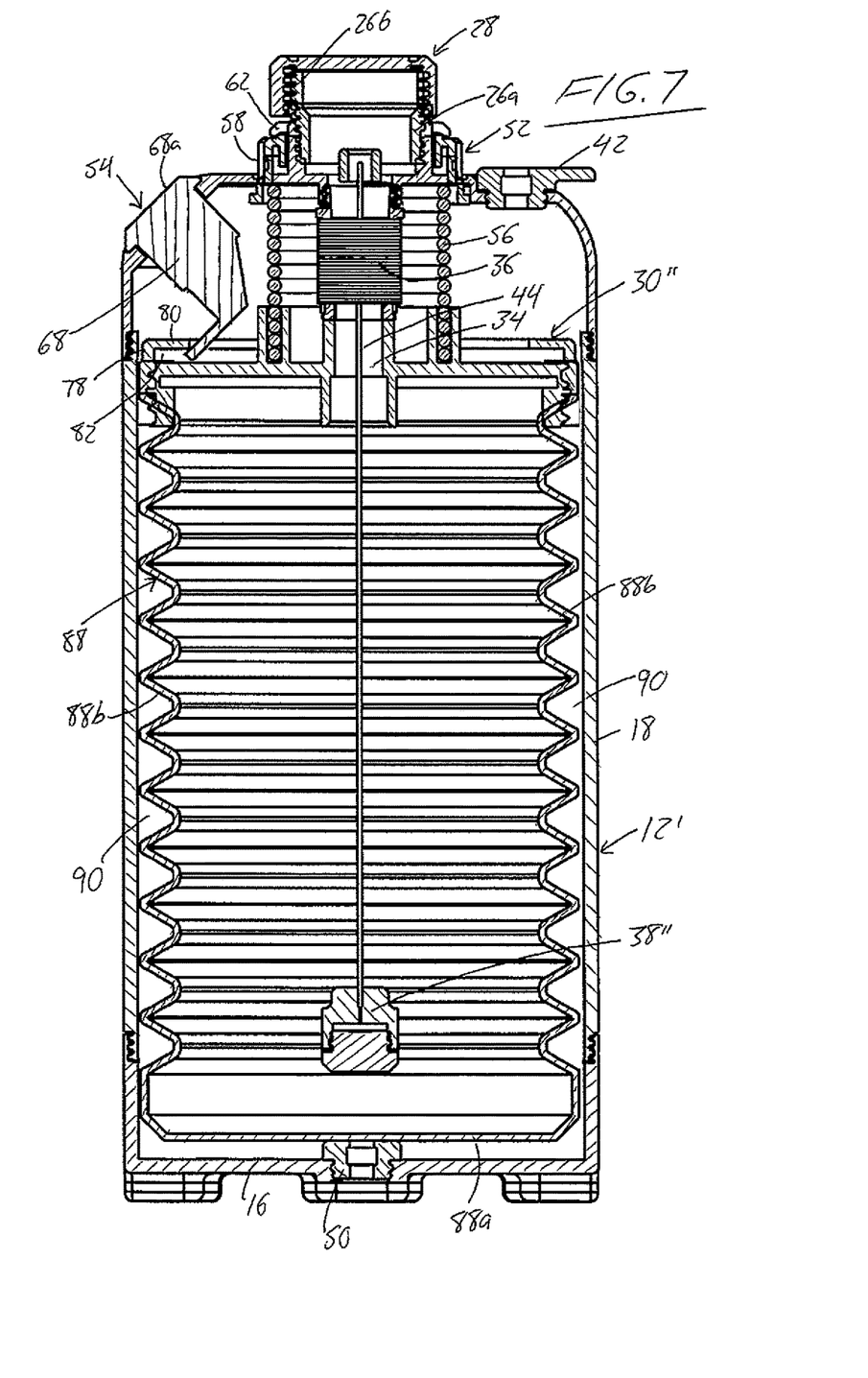
FIG. 7 is a cross-sectioned elevation view of a container according to a fourth embodiment of the present invention with the piston thereof locked in its fully raised position.

FIG. 7 illustrates a fourth embodiment which differs from the third embodiment only in that the piston 30" is no longer sealed to the peripheral wall 18 of the container in a manner fluidly isolating the upper and lower chambers from one another, and an axially expandable collapsible internal enclosure 88 is instead attached to the piston 30" to hang from the underside thereof in the lower chamber so as to receive and contain the liquid inside axially this expandable collapsible internal enclosure 88. The lower one-way valve 50 in the third embodiment allows air to enter the lower chamber during lifting of the piston to prevent creation of a vacuum in the lower chamber that may otherwise result in a vacuum-locked state preventing the piston from reaching its fully raised position. When the lower chamber is filled with liquid, the liquid prevents air from entering the lower one-way valve 50. In the fourth embodiment, in which the upper chamber is in fluid communication around the outer periphery of the piston 30" with the outer areas 90 of the lower chamber that are disposed outside the internal enclosure 88, the illustrated lower one-way valve 50 may optionally be omitted.

The internal enclosure 88 may be defined by a flexible bag sealed to the piston at area spanning around the flow-through opening 34, for example at a radial distance outward therefrom at or near the outer periphery of the piston 30" that is slidable along, but not fully sealed with, the peripheral wall 18 of the bottle. The illustrated fourth embodiment illustrates the internal enclosure 88 as a flexible accordion-like bag with a closed bottom end 88a and pleated sides 88b that enable the axial collapse and expansion of the bag along the longitudinal axis of the container.

The operation of the fourth embodiment is the same as that described for the third embodiment. FIG. 7 shows the container in a state ready for removal of the cap 28 and filling of the container, where the piston 30" has been locked in its fully raised position using the locking member 68, and the winding mechanism 52 has been subsequently used to unwind the flexible elongate member 44 and thereby lower the closure member 38" out of its closed position in order to open the flow-through opening 34 of the piston 30". The liquid is then poured into the container through the opened neck 26 of the container to fill the inner enclosure 88 in the lower chamber with said liquid, and as described for the third embodiment, the piston is then unlocked. At this point, the piston 30" and attached upper end of the collapsible inner enclosure 88 are driven downward by gravity and the spring 56 toward the surface of the liquid received in the internal enclosure. At this point, the winding mechanism 52 is used to pull the closure member 38" up into its closed position obstructing the flow-through opening 34 of the piston 30", thereby sealing off the interior space of the internal enclosure 88 so as to preserve the gas-containing liquid. Any time consumption of the liquid is desired, the winding mechanism 52 is used to disengage the closure member 38" from the flow-through opening 34 in order to re-open this opening 34 for consumption of the liquid through the neck 26 of the bottle. The raising of the piston 30" in preparation for filling of the container is performed in the same manner as the third embodiment, during which the raising of the piston 30" also lifts the upper end of the internal enclosure 88 so as to reinstate the internal enclosure 88 to its maximum internal volume for accepting the liquid therein.

As shown in FIGS. 5C and 5D, an optional cork member 92 may disposed beneath, or attached to, the underside of the piston 30, for example to prevent direct contact between the liquid and a stainless steel or other non-cork material that may be used for the rest of the piston. In the drawings, the cork member 92 is of a relatively flat annular shape that covers an annular bottom end 30a of the piston 30', from which a remainder of the piston's underside is recessed, as illustrated by recessed cavity 94. The cork member 92 may be free-floating, i.e. separate from the piston 30', thus relying on the buoyancy of the cork material to automatically ride on the surface of the liquid, or may be attached to the piston for movement therewith. The cork forms a barrier between the liquid surface and the underside of the piston, over at least some of the area thereof. The buoyancy of the cork provides floats the piston a small distance above the liquid to maintain this separation between the liquid and at least the cork-covered areas of the piston. The illustrated cork member of annular form only covers a partial area of the piston's underside, but in a stationary condition of the container is sufficient to prevent contact between the liquid and the recessed cavity areas of the piston. Other embodiments may feature greater, or full, coverage of the piston's underside with cork material.

Although the containers of the present invention have been described in the context of preserving carbonated beverages, it will be appreciate that the same container may be used to preserve other gas-containing liquids, or liquids (whether gas-containing or not), for example wine or other liquids that are desirable to store in an air-tight enclosure preventing exposure of the liquid to atmospheric air.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for preserving liquids, said apparatus comprising:
   a container having a bottom wall, a peripheral wall standing upward from the bottom wall and enclosing around an interior space of the container disposed above the bottom wall thereof, and an upper portion disposed atop the peripheral wall to substantially close off an upper end of the interior space, the bottom wall and the upper portion being separated from one another in an axial direction of said container;
   an impermeable piston disposed within the interior space of the container and having a peripheral sliding seal that engages the wall of the container, thereby separating the interior space of the container into a lower chamber disposed below the peripheral sliding seal for storage of a liquid in said lower chamber, and an upper chamber defining a remainder of the interior space above the peripheral sliding seal;
   an axially extendable and collapsible conduit having a lower end connected to the piston in a sealed manner around a flow opening that passes axially through the piston at a location spaced inwardly from the peripheral sliding seal, and an upper end connected to the upper portion of the container in a sealed condition around a mouth opening therein;
   a valve mechanism that is located within the interior space of the container below the flow opening in the piston, and is raiseable into a closed position closing off the flow opening and lowerable into an open position opening up the flow opening, whereby opening of the valve mechanism allows pouring of the liquid from the container via the flow opening, the conduit and the mouth, and closing of the valve mechanism seals the lower chamber closed in order to preserve the liquid; and
   a user-operated control device operable from outside the container to raise the valve mechanism into the closed position.

2. An apparatus for preserving liquids, said apparatus comprising:
   a container having a bottom wall, a peripheral wall standing upward from the bottom wall and enclosing around an interior space of the container disposed above the bottom wall thereof, and an upper portion disposed atop the peripheral wall to substantially close off an upper end of the interior space, the bottom wall and the upper portion being separated from one another in an axial direction of said container;
   an impermeable piston disposed within the interior space of the container and dividing the interior space of the container into a lower chamber disposed below the piston for storage of a liquid in said lower chamber, and an upper chamber disposed above the piston;
   an axially extendable and collapsible conduit having a lower end connected to the piston in a sealed manner around a flow opening that passes axially through the piston at a location spaced inwardly from a periphery thereof, and an upper end connected to the upper portion of the container in a sealed condition around a mouth opening therein; and
   a valve mechanism that is located within the interior space of the container below the flow opening in the piston, and is raiseable into a closed position closing off the flow opening and lowerable into an open position opening up the flow opening, whereby opening of the valve mechanism allows pouring of the liquid from the container via the flow opening, the conduit and the mouth, and closing of the valve mechanism seals the lower chamber closed in order to preserve the liquid; and
   a user-operated control device operable from outside the container to raise the valve mechanism into the closed position.

3. The apparatus of claim 2 comprising an axially expandable and collapsible internal enclosure housed in the lower chamber and affixed to the piston in communication with the flow opening thereof so as to receive the liquid inside the axially expandable and collapsible internal enclosure.

4. The apparatus of claim 3 wherein the upper chamber is in fluid communication with outer areas of the lower chamber that are disposed outside the expandable and flexible internal enclosure.

5. The apparatus of claim 4 wherein the upper chamber and the outer areas of the lower chamber are in fluid communication around an outer periphery of the piston.

6. The apparatus of claim 1 comprising a one-way valve communicating the upper chamber of the interior space with an external environment outside the container.

7. The apparatus of claim 6 wherein the one-way valve is situated on the upper portion of the container.

8. The apparatus of claim 6 wherein the one-way valve is removably mounted to the container.

9. An apparatus for preserving liquids, said apparatus comprising:
   a container having a bottom wall, a peripheral wall standing upward from the bottom wall and enclosing around an interior space of the container disposed above the bottom wall thereof, and an upper portion disposed atop the peripheral wall to substantially close off an upper end of the interior space, the bottom wall and the upper portion being separated from one another in an axial direction of said container;
   an impermeable piston disposed within the interior space of the container and having a peripheral sliding seal that engages the wall of the container, thereby separating the interior space of the container into a lower chamber disposed below the peripheral sliding seal for storage of a liquid in said lower chamber, and an upper chamber defining a remainder of the interior space above the peripheral sliding seal;
   an axially extendable and collapsible conduit having a lower end connected to the piston in a sealed manner around a flow opening that passes axially through the piston at a location spaced inwardly from the peripheral sliding seal, and an upper end connected to the upper portion of the container in a sealed condition around a mouth opening therein;
   a valve mechanism located within the interior space of the container and movable between open and closed positions that respectively open and close the flow opening in the piston, whereby opening of the valve mechanism allows pouring of the liquid from the container via the flow opening, the conduit and the mouth, and closing of the valve mechanism seals the lower chamber closed in order to preserve the liquid; and a user-operated control device operable from outside the container to move the valve mechanism into the closed position;

wherein the control device comprises an elongated member passing downwardly through the axially extendable and collapsible conduit to the valve mechanism from outside the container, whereby pulling of the elongated member via a portion thereof disposed outside the container draws the valve mechanism upward into the closed position closing off the flow opening of the piston.

10. The apparatus of claim 9 wherein the container comprises a neck at the upper portion thereof, the elongated member comprises a flexible elongated member, and the control device comprises a rotatable collar that is disposed around the neck of the container and to which an end of the flexible elongated member is attached to the rotatable collar outside the container, whereby rotation of the rotatable collar in one direction around the neck winds more of the flexible elongated member around the neck of the container in order to draw the valve mechanism upward, and rotation of the rotatable collar in an opposite direction releases more of the flexible elongated member back into the container to lower the valve mechanism.

11. The apparatus of claim 10 wherein the rotatable collar is arranged for self-locking in any of a plurality of different lockable angular positions around the neck of the container in order to maintain a given wound/unwound state of the flexible elongated member and thereby maintain a given position of the valve mechanism.

12. The apparatus of claim 11 wherein the rotatable collar and the container comprise matable male and female features carried on opposing ones thereof, and each lockable angular position of the rotatable collar features engagement between at least one pair of said matable male and female features.

13. The apparatus of claim 12 wherein the matable male and female features are axially oriented relative to the neck of the container, and the rotatable collar is biased in a lock engaging axial direction of the neck that engages the male and features together.

14. The apparatus of claim 13 comprising a resilient member spanning circumferentially about the neck at an end of the rotatable collar opposite the male and female features, the resilient member biasing the rotatable collar in the lock-engaging axial direction and being compressible under forced movement of the collar in an opposing lock-releasing axial direction of the neck to disengage the male and female features and thereby unlock the collar and allow rotation thereof.

15. The apparatus of claim 14 wherein the resilient member comprises an o-ring.

16. The apparatus of claim 1 wherein the valve mechanism is gravitationally biased out of said closed position into the open position.

17. The apparatus of claim 1 wherein the valve mechanism comprises a closure member has having a density greater than the liquid such that sinking action of the closure member in the liquid biases the valve mechanism into the open position.

18. The apparatus of claim 1 comprising a coil spring disposed around the axially extendable and collapsible conduit and biasing the piston toward the bottom wall of the container.

19. A method of using the apparatus of claim 1, the method comprising:

(a) with a liquid disposed within the lower chamber of the interior space of the container, closing the valve mechanism, thereby sealing off the liquid during storage thereof within the container.

* * * * *